(12) United States Patent  (10) Patent No.: US 8,299,910 B2
Hammerschmidt et al.  (45) Date of Patent: Oct. 30, 2012

(54) INTELLIGENT TIRE SYSTEMS AND METHODS

(75) Inventors: Dirk Hammerschmidt, Villach (AT); Jakob Jongsma, Graz (AT)

(73) Assignee: Infineon Technologies, AG, Neubiberg (DE)

(*) Notice: Subject to any disclaimer, the term of this patent is extended or adjusted under 35 U.S.C. 154(b) by 0 days.

(21) Appl. No.: 13/218,991

(22) Filed: Aug. 26, 2011

(65) Prior Publication Data

US 2011/0309927 A1 Dec. 22, 2011

Related U.S. Application Data

(63) Continuation of application No. 11/856,748, filed on Sep. 18, 2007, now Pat. No. 8,077,025.

(51) Int. Cl.
*B60C 23/00* (2006.01)

(52) U.S. Cl. .......... 340/447; 340/426.33; 340/468

(58) Field of Classification Search .......... 340/442–449, 340/426.33, 426.31, 463, 468
See application file for complete search history.

(56) References Cited

U.S. PATENT DOCUMENTS

| | | | |
|---|---|---|---|
| 6,683,537 B2 | 1/2004 | Starkey | |
| 6,739,195 B2* | 5/2004 | Evans et al. | 73/598 |
| 6,772,505 B1* | 8/2004 | Logan et al. | 29/600 |
| 6,825,758 B1* | 11/2004 | Laitsaari | 340/442 |
| 7,116,213 B2 | 10/2006 | Thiesen | |
| 7,257,426 B1 | 8/2007 | Witkowski | |
| 7,284,418 B2 | 10/2007 | Yin | |
| 7,456,596 B2 | 11/2008 | Goodall | |
| 8,009,027 B2* | 8/2011 | Thomas et al. | 340/447 |
| 2004/0066289 A1* | 4/2004 | Lin | 340/447 |
| 2005/0036297 A1* | 2/2005 | Thomas et al. | 362/42 |
| 2005/0204806 A1 | 9/2005 | Brusarosco | |
| 2007/0069877 A1 | 3/2007 | Fogelstrom | |
| 2007/0080795 A1 | 4/2007 | Ichikawa | |
| 2008/0202624 A1 | 8/2008 | Hajiaghajani | |

OTHER PUBLICATIONS

U. S. Appl. No. 11/856,748, filed Sep. 18, 2007, Inventor Hammerschmidt et al.

* cited by examiner

*Primary Examiner* — Daniel Previl

(74) *Attorney, Agent, or Firm* — Patterson Thuente Christensen Pedersen, P.A.

(57) ABSTRACT

Embodiments relate to intelligent tire systems and methods. In an embodiment, a sensor module mounted in a tire includes a sensor configured to generate sensor data related to a condition of the tire; and a transceiver communicatively coupled to the sensor and configured to communicate with another in-tire sensor module and with a control unit external to the tire.

18 Claims, 3 Drawing Sheets

8,299,910 B2

INTELLIGENT TIRE SYSTEMS AND METHODS

RELATED APPLICATION

This application is a continuation of application Ser. No. 11/856,748 filed Sep. 18, 2007, which is hereby incorporated herein by reference in its entirety.

FIELD OF THE INVENTION

The invention generally relates to intelligent tire systems. More particularly, the invention relates to sensor networks implemented in vehicle tires or other structures.

BACKGROUND OF THE INVENTION

Tire pressure monitoring systems (TPMS) are used to monitor conditions within and surrounding vehicle tires. Parameters typically monitored include local temperature and pressure information. Most TPMS comprise tire-based sensors and other components that monitor and then transmit the local information via radio signals to a central receiver in another part of the vehicle. Power is supplied to the tire-based systems by local batteries, energy harvesters or scavengers, or other means.

To further improve vehicle and transportation safety, it is desired to monitor and transmit additional parameters, such as the form and size of a tire bearing surface, the depth of a tire tread profile, the temperature of the bearing surface, the stress in the tire due to acceleration or centrifugal force effects in curves, and other characteristics. It is desired to measure and monitor these and other conditions and characteristics, for example, in next-generation intelligent tire systems (ITS). The type and amount of information that can be monitored and transmitted by current systems and technologies, however, are limited by the power required locally in or around the tire to carry out these tasks, in particular the power necessary to wirelessly exchange communications with the central receiver some distance away.

SUMMARY OF THE INVENTION

Embodiments relate to intelligent tire systems and methods.

In an embodiment, a sensor module mounted in a tire comprises a sensor configured to generate sensor data related to a condition of the tire; and a transceiver communicatively coupled to the sensor and configured to communicate with another in-tire sensor module and with a control unit external to the tire.

In an embodiment, an integrated circuit sensor device for mounting in a tire of a vehicle, comprises a first sensor element configured to obtain first sensor data; and a transceiver coupled to the first sensor element and configured to receive second sensor data from a second sensor element mounted in the tire and to transmit the first sensor data and the second sensor data to a receiver mounted in the vehicle external to the tire.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood from the following detailed description of various embodiments in connection with the accompanying drawings, in which.

Figure 1:
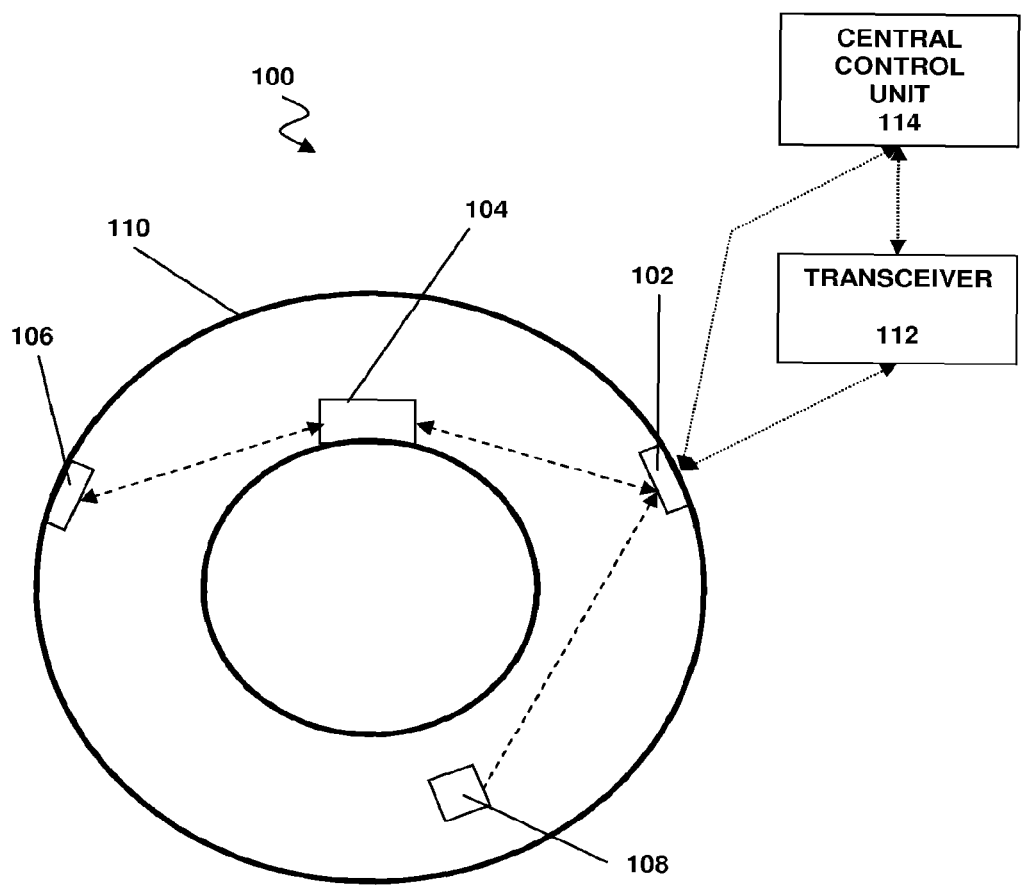
FIG. 1 depicts an intelligent tire system according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Embodiments relate to sensor networks, such as sensor networks implemented in and about vehicle tires. Various embodiments can reduce transmission time and energy requirements between tire-based components and a central receiver, enhancing the overall capabilities of next-generation ITS or other system capabilities. The invention can be more readily understood by reference to FIGS. 1-3 and the following description. While the invention is not necessarily limited to the specifically depicted application(s), the invention will be better appreciated using a discussion of exemplary embodiments in specific contexts.

Referring to FIG. 1, one embodiment of an intelligent tire system (ITS) 100 implemented in a vehicle is depicted. ITS 100 comprises a plurality of sensor devices 102, 104, 106, 108 mounted on or about a wheel or tire 110, a transceiver 112, and a central control unit 114. ITS 100 optionally comprises additional tire- or vehicle-mounted components (not shown) for storing data, transmitting communications, and carrying out other functions. Further, while FIG. 1 depicts four sensor devices 102-108, ITS 100 can comprise more or fewer sensor devices in other embodiments, arranged in configurations other than the example depicted and described in more detail below.

Sensor devices 102-108 can each comprise one of a variety of sensor types, such as pressure, inertia, acceleration, temperature, magnetic, stress, and others. Each sensor device 102-108 is mounted in or on tire 110 at a point suited for taking measurements associated with the respective sensor type or application. In one embodiment, each sensor device 102-108 further comprises a transmission interface (not shown). The transmission interface can comprise a radio frequency (RF) transponder adapted to send and/or receive communications. In one embodiment, the RF transponder is a short-range transponder, adapted to transmit information between or among sensor devices 102-108 or other points within tire 110. Such short-range transmissions generally require less power than transmissions sent to a central receiver or other points in the vehicle.

Each of the plurality of sensor devices 102-108 is adapted to send data transmissions, while at least one of the plurality of sensor devices 102-108 can be further adapted to receive and retransmit data in one embodiment. More specifically, sensor device 102 comprises an acceleration sensor adapted to measure acceleration at a bearing surface or tread of tire 110. Sensor device 102 also comprises a transceiver for receiving transmissions within tire 110 and transmitting data at ranges external to tire 110. Sensor device 104 comprises a sensor for tire pressure and temperature measurement and includes a transceiver for short ranges within tire 110 and possible further transmissions. Sensor device 106 can comprise a temperature sensor for measuring a temperature of the bearing surface of tire 110 and, similar to sensor device 104 equipped with a transceiver for short ranges within the tire. Sensor device 108 is a stress sensor adapted to detect stress in the sidewall of tire 110 and comprises a short range transponder. Sensor device 104 is adapted to receive transmissions from at least sensor device 106 and additionally to transmit to sensor device 102. Sensor device 102 is adapted to receive transmissions from sensor devices 104 and 102 and further to transmit external to tire 110. As previously mentioned, other sensor types and configurations can be implemented in other embodiments, the particular sensor arrangement described herein being exemplary of only one embodiment.

Transceiver 112 is external to tire 110 and is adapted to pass data received from within tire 110 to central control unit 114. In the embodiment of FIG. 1, transceiver 112 receives data from sensor device 102 and subsequently transmits this data to central control unit 114. In one embodiment, transceiver 112 is part of central control unit 114, incorporated directly on the board of central control unit 114. In another embodiment, transceiver 112 can be physically intermediate tire 110 and central control unit 114, such as in the wheel housing, and can transmit data to central control unit 114 by RF, a galvanic connection, or another means. In a related embodiment, transceiver 112 can be adapted to radiate a signal around sensor device 102 to determine where sensor device 102 is on the radius as tire 110 rotates. Additionally, sensor device 102 can determine the strength of the signal radiated by and received from transceiver 112 and transmit its own data back at a maximum or high point, which could coincide with a minimum physical distance between sensor device 102 and transceiver 112 during rotation of tire 110, to further minimize the transmission power required by sensor device 102. Further, if a transceiver 112 is located in the wheel housing of each tire 110 of a vehicle, transceiver 112 could be used to localize the individual tires according to a particular field strength at each tire 110.

In another embodiment, transceiver 112 is intermediate the sensor devices located in at least one tire 110 and central control unit 114, while the sensor devices in at least one other tire 110 communicate directly with central control unit 114. Such a configuration could be used when central control unit 114 is located closer to, for example, the two front tires of a vehicle, permitting shorter-range direct communications between the sensor devices located at those two tires, while transceiver 112 is used to hop signals from the sensor devices in the rear tires.

In yet another embodiment, transceiver 112 is omitted. Embodiments including transceiver 112, however, generally require lower transmitting power by sensor device 102 to communicate with central control unit 114 because sensor device 102 needs only transmit to intermediate transceiver 112 rather than all the way to central control unit 114.

Figure 2:
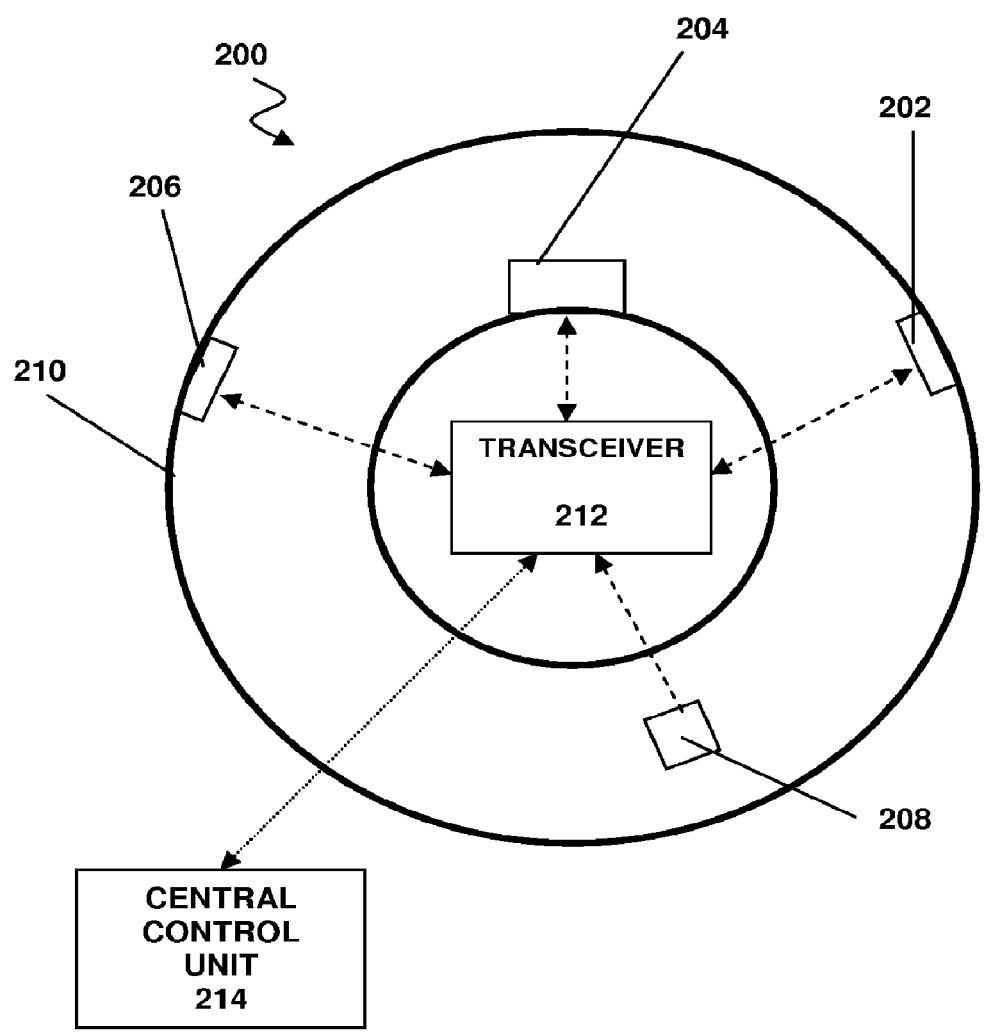
FIG. 2 depicts an intelligent tire system according to an embodiment of the invention.

Referring to FIG. 2, another ITS 200 according to an embodiment of the invention is depicted. ITS 200 comprises a spoke or star-like configuration of a plurality of sensor devices 202-208 arranged about transceiver 212 disposed near the center of wheel or tire 210. Similar to ITS 200 and sensor devices 102-108, each of the plurality of sensor devices 202-208 can comprise one of many sensor types and includes a one- or two-way transponder. As depicted, sensor devices 202, 204, and 206 comprise two-way transponders to both send and receive communications with transceiver 112, while sensor device 208 comprises a one-way transponder to send communications to transceiver 212. Other combinations and configurations of one- and two-way transponders are possible in other embodiments of ITS 200. In ITS 200, each sensor device 202-208 requires lower transmission power because only short-range transmissions are needed to communicate with transceiver 210, with a range in one embodiment extending to the axle or outside of the rim. Transceiver 210 can then communicate with central control unit 214.

Figure 3:
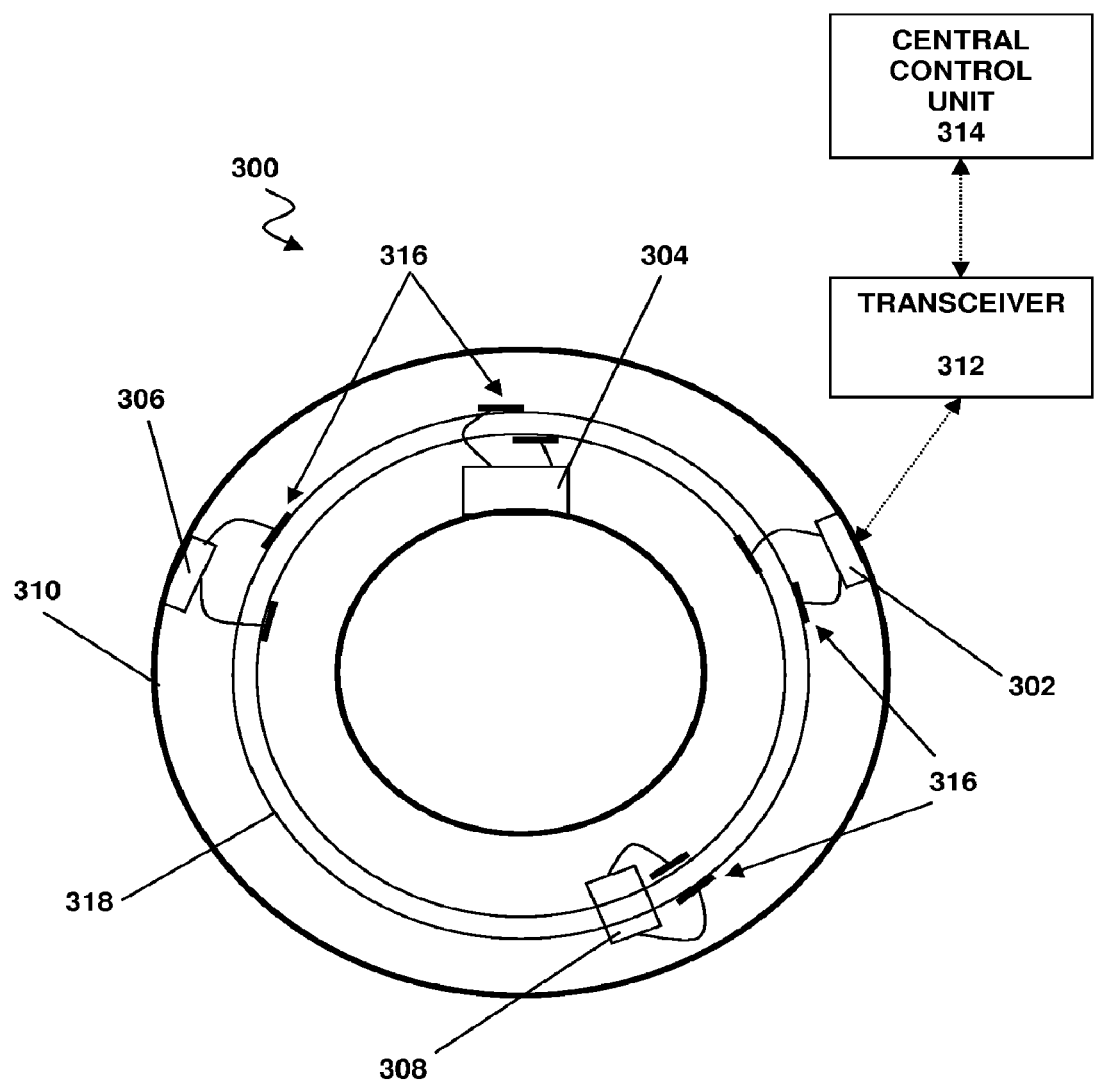
FIG. 3 depicts an intelligent tire system according to an embodiment of the invention.

Referring to FIG. 3, yet another embodiment of an ITS 300 is depicted. Similar to ITS 100 and ITS 200 previously described, ITS 300 comprises a plurality of sensor devices 302-308 mounted in or on a tire 310. Data from sensor devices 302-308 is communicated to a transceiver 312 and central control unit 314, although in one embodiment transceiver 312 is optional and sensor devices 302-308 communicate directly, in one way or another as previously described, with central control unit 314. Each of the plurality of sensor devices 202-208 can comprise one of many sensor types, as previously mentioned regarding ITS 100 and ITS 200.

In ITS 300, each of the plurality of sensor devices 302-308 is capacitively coupled (at 316) to two leads 318 embedded within tire 310. RF signal communications in ITS 300, and thereby the required power, are reduced as sensor devices 302-308 can utilize the embedded network formed by leads 318 to communicate. In other embodiments of ITS 300, at least one of the leads 318 can be replaced by the rim or by the steel belt in the bearing surface of tire 310. This position in the center can be advantageous due to lower centrifugal forces and thus permits use of a larger battery, a macroscopic energy harvester, or large coils for LF power transmission in transceiver 212. In yet another embodiment, a combination of an embedded network, such as ITS 300, and a radio frequency network within a tire, such as ITSs 100 and 200, can be used to efficiently communicate information among and from individual sensor devices to a central control unit.

Sensor networks, such as those described with reference to ITSs 100, 200, and 300 in FIGS. 1-3, reduce the power required to communicate data and information between a vehicle tire and a central control unit while increasing the amount and types of information that can be transmitted. The transmitted data and information can then be utilized by the central control unit to improve vehicle and occupant safety, such as by warning the driver of unstable or altered road conditions, reduced tire pressure, rapidly decreasing tire pressure, changed tire temperature, changing tire or vehicle performance, tire wear, vehicle load, and many other conditions detectable in or at the tire and affecting the overall safety and performance of the vehicle.

Although specific embodiments have been illustrated and described herein for purposes of description of an example embodiment, it will be appreciated by those of ordinary skill in the art that a wide variety of alternate and/or equivalent implementations calculated to achieve the same purposes may be substituted for the specific embodiments shown and described without departing from the scope of the present invention. Those skilled in the art will readily appreciate that the invention may be implemented in a very wide variety of embodiments. This application is intended to cover any adaptations or variations of the various embodiments discussed herein, including the disclosure information in the attached appendices. Therefore, it is manifestly intended that this invention be limited only by the claims and the equivalents thereof.

The invention claimed is:

1. A sensor module mounted in a tire comprising:
   a sensor configured to generate sensor data related to a condition of the tire; and
   a transceiver communicatively coupled to the sensor and configured to communicate with another in-tire sensor module and with a control unit external to the tire wherein the transceiver is configured to communicate with the other in-tire sensor module by a signal of a first range and with the control unit by a signal of a second range, the first range being shorter than the second range.

2. The sensor module of claim 1, further comprising a package, the sensor and the transceiver arranged in the package.

3. The sensor module of claim 1, wherein the sensor comprises at least one of a pressure sensor, a temperature sensor, an inertia sensor, an acceleration sensor, a magnetic sensor, or a stress sensor.

4. The sensor module of claim 1, wherein the transceiver is configured to communicate with the other in-tire sensor module by receiving sensor data from the other in-tire sensor module.

5. The sensor module of claim 4, wherein the transceiver is configured to communicate with the control unit by transmitting the sensor data from the sensor and from the other in-tire sensor module.

6. The sensor module of claim 1, wherein the transceiver is configured to communicate with at least one additional in-tire sensor module.

7. The sensor module of claim 1, wherein the transceiver is configured to receive communications from the control unit.

8. An integrated circuit sensor device for mounting in a tire of a vehicle, comprising:
a first sensor element configured to obtain first sensor data; and
a transceiver coupled to the first sensor element and configured to receive second sensor data from a second sensor element mounted in the tire and to transmit the first sensor data and the second sensor data to a receiver mounted in the vehicle external to the tire wherein the transceiver is configured to communicate with the second sensor element by a signal of a first range and with the receiver by a signal of a second range, the first range being shorter than the second range.

9. The integrated circuit sensor device of claim 8, wherein the transceiver is configured to receive signals from the receiver.

10. The integrated circuit sensor device of claim 9, wherein the transceiver is configured to determine a strength of a signal from the receiver.

11. The integrated circuit sensor device of claim 10, wherein the transceiver is configured to transmit to the receiver at a point corresponding to a maximum of the strength.

12. The integrated circuit sensor device of claim 11, wherein the point is a physical location of the transceiver during rotation of the tire.

13. The integrated circuit sensor device of claim 8, wherein the first and second sensor elements are each selected from the group consisting of a pressure sensor, a temperature sensor, an inertia sensor, an acceleration sensor, a magnetic sensor, and a stress sensor.

14. The integrated circuit sensor device of claim 8, wherein the receiver is a control unit.

15. The integrated circuit sensor device of claim 8, wherein the receiver communicates with a control unit mounted in the vehicle external to the tire.

16. The integrated circuit sensor device of claim 8, further comprising a package, wherein the first sensor element and the transceiver are disposed in the package.

17. The integrated circuit sensor device of claim 8, wherein the transceiver is configured to receive additional sensor data from at least one additional sensor element mounted in the tire.

18. The integrated circuit sensor device of claim 17, wherein the transceiver is configured to transmit the additional sensor data with the first sensor data and the second sensor data to the receiver.

* * * * *